July 3, 1956   B. JONES   2,752,949
DIFFERENTIAL PRESSURE RESPONSIVE BELLOWS DEVICE
Filed Aug. 27, 1953   3 Sheets-Sheet 1

BARTON JONES
INVENTOR.

BY Hazard & Miller
ATTORNEYS

July 3, 1956 B. JONES 2,752,949
DIFFERENTIAL PRESSURE RESPONSIVE BELLOWS DEVICE
Filed Aug. 27, 1953 3 Sheets-Sheet 2

BARTON JONES
INVENTOR.

BY Hazard & Miller

ATTORNEYS

July 3, 1956               B. JONES               2,752,949

DIFFERENTIAL PRESSURE RESPONSIVE BELLOWS DEVICE

Filed Aug. 27, 1953               3 Sheets-Sheet 3

BARTON JONES
INVENTOR.

BY Hazard & Miller

ATTORNEYS

United States Patent Office 2,752,949
Patented July 3, 1956

2,752,949

DIFFERENTIAL PRESSURE RESPONSIVE BELLOWS DEVICE

Barton Jones, Los Angeles, Calif.

Application August 27, 1953, Serial No. 376,922

7 Claims. (Cl. 137—784)

This invention relates to a differential pressure responsive device.

One object of the present invention is to provide an improved pressure responsive device consisting essentially of a single bellows which is subjected on the interior and exterior thereof to the pressures between which a differential may exist. This single bellows is anchored at one end and is movable at the other so that it is responsive to a differential between the pressures applied to its interior and exterior. Within the bellows there is a liquid to which one of the pressures is conducted. On the exterior of the bellows there may be a liquid to which the other of the pressures is conducted and by which it is transmitted to the bellows. However, the use of a liquid externally of the bellows is optional or non-essential in that if the pressures between which the differential exists is a gas pressure, the gas pressure may be conducted directly to the exterior of the bellows instead of through an intervening liquid. Associated with the movable end of the bellows is a stem carrying two opposed closures engageable with two opposed valve seats and as these closures and valve seats are submerged in the liquid within the bellows, if the differential between the two pressures becomes excessive one of the closures will seat upon its respective valve seat, thus confining liquid within the bellows and consequently preventing rupture of the bellows. In this manner, if the differential between the pressures becomes excessive in one direction further ingress of liquid into the bellows is prevented. On the other hand, if the differential in pressures becomes excessive in the other direction the incompressibility of the confined or entrapped liquid within the bellows will prevent its collapse. In this manner in the improved differential pressure responsive device wherein a single bellows responsive to the two pressures is employed the bellows is adequately protected against rupture or destruction whenever the differential between the pressures becomes excessive.

Differential pressure responsive devices of this character are frequently used to measure the flow of fluids which are either corrosive in their nature or contain injurious sediments of various characters. The movement of the stem associated with the movable end of the bellows must be transmitted through the wall of the housing to the exterior thereof in some manner such as by a torque tube. This movement may be used to move a pointer over a dial or modify or control some other form of responsive device. Whatever mechanism is used to transmit the movement of the stem and consequently the movement of the free end of the bellows to the exterior should be confined or submerged within a liquid which is kept clean or free of corrosive substances at all times.

It is consequently another object of the invention to provide a differential pressure responsive device wherein but a single bellows is used and wherein clean liquid is confined within the bellows and about the mechanism which transmits the movements of the stem and free end of the bellows to the exterior of the housing. The confining means is such that expansion and contraction of the confined liquid due to temperature changes will not alter or modify the position of the bellows, but instead will be absorbed and compensated for by the confining means. In this manner, the device is automatically compensated for temperature changes and the liquid confined within the bellows and about the motion-transmitting means is maintained in a clean state at all times, thus avoiding corrosion of the working parts. If the fluid pressure transmitted to the exterior of the bellows is of such a character that it may corrode the bellows itself, liquid is also confined about the exterior of the bellows which is likewise maintained in a clean condition at all times.

Another object of the invention is to provide an improved differential pressure responsive device which can be easily and economically manufactured and assembled and which has relatively few parts, all of which can be adequately protected against corrosion, dirt, and wear.

With the foregoing and other objects in view, which will be made manifest in the following detailed description and specifically pointed out in the appended claims, reference is had to the accompanying drawings for an illustrative embodiment of the invention, wherein:

Figure 3:
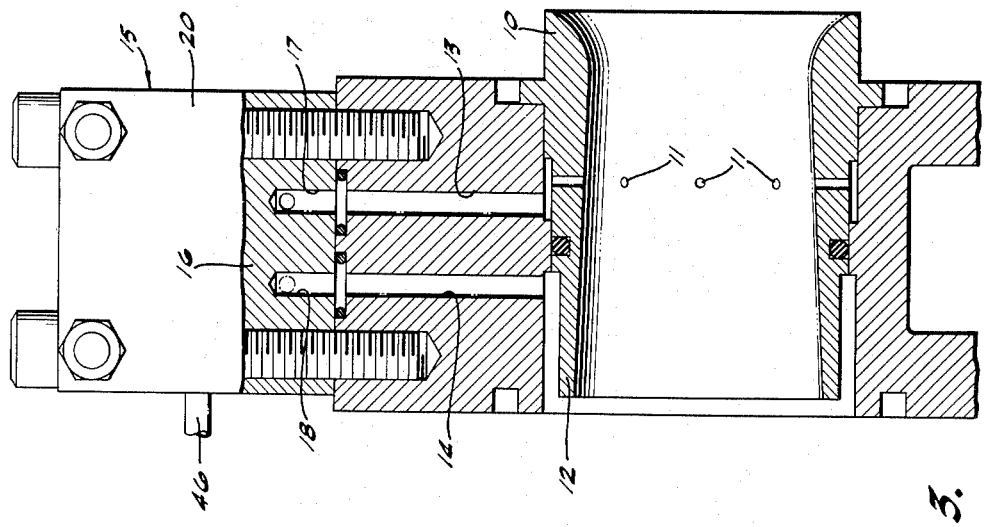
Fig. 3 is a sectional view taken substantially upon the line 3—3 upon Fig. 2.
Figure 1:
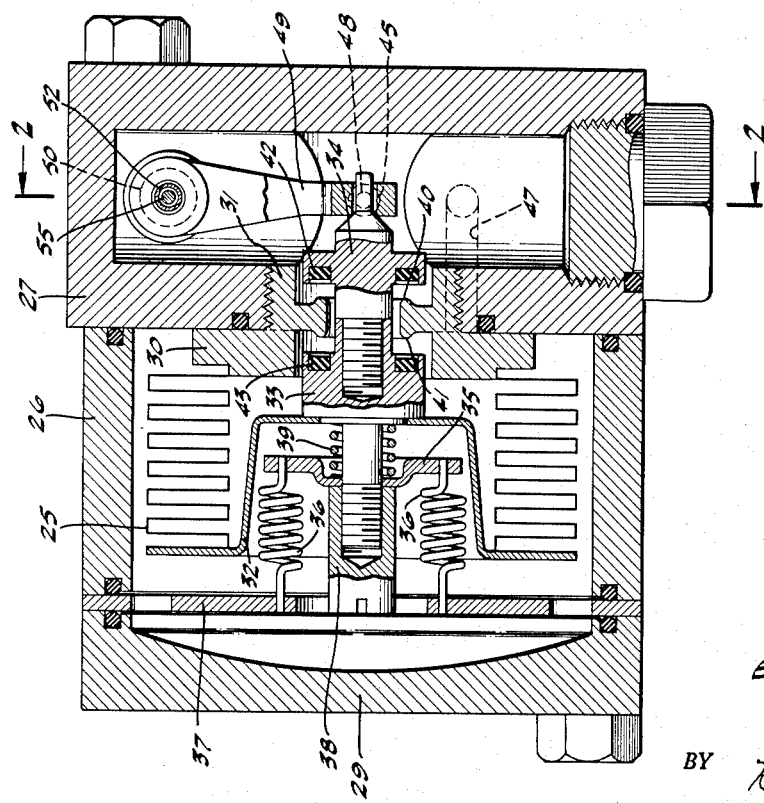
Figure 1 is a longitudinal vertical section through the differential pressure responsive device embodying the present invention.
Figure 2:
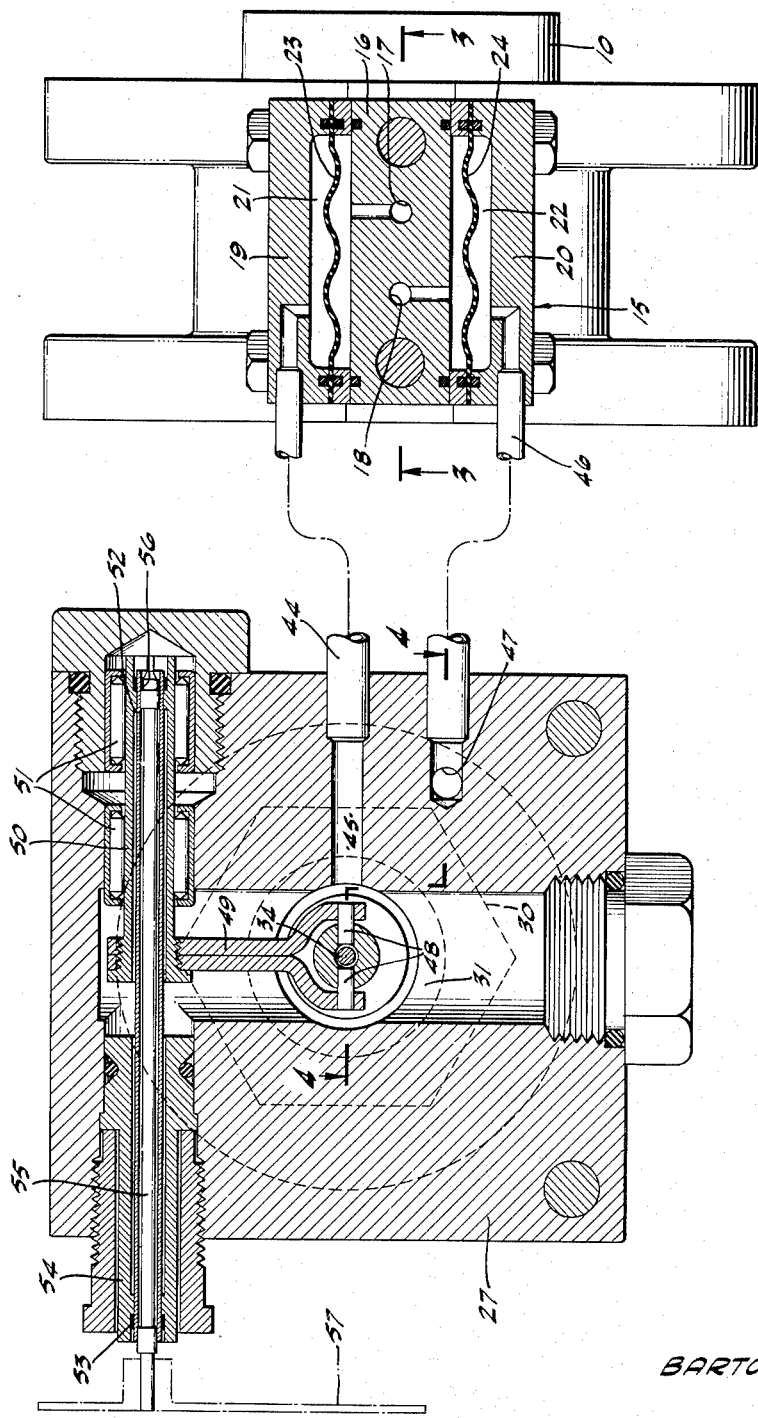
Fig. 2 is a sectional view taken substantially upon the line 2—2 upon Fig. 1 in the direction indicated.

Referring to the accompanying drawings wherein similar reference characters designate similar parts throughout, there is illustrated in Fig. 3 a typical device for creating pressures between which a differential may exist. This consists of a venturi throat 10 through which a fluid may be assumed to flow. This throat is perforated as at 11 and has a relieved skirt at its downstream end as indicated at 12. In this type of differential pressure creating instrument, a lower pressure will be transmitted through the perforations 11 to the bore 13 than will be transmitted around the skirt to the bore 14. These bores are located in a surrounding housing within which the throat 10 is positioned, it being assumed that the housing is suitably mounted within the conduit through which the fluid flows in passing through the throat 10.

It will be understood that the throat 10 is but one of many forms of construction that may be employed to cause the existence of two pressures between which a differential may exist. Other forms of construction may be employed in lieu thereof, such as for example, orifice plates and the like.

In the form of construction illustrated in Figs 1 to 4, a diaphragm housing indicated at 15 is mounted on top of the housing for the throat 10. This diaphragm housing has a central part 16 in which there are bores 17 and 18 which register with the bores or passages 13 and 14, respectively. The diaphragm housing also has end heads 19 and 20 which provide diaphragm chambers 21 and 22 in which there are diaphragms 23 and 24. The pressure in the passage 13 is conducted to one face of the diaphragm 23 and the pressure in the passage 14 is conducted to one face of the diaphragm 24. These diaphragms are preferably formed of a limp material which will have no appreciable spring. A suitable material for these diaphragms is that material marketed under the trade name of "Teflon" although other materials which are equally limp, adequately strong, and which are resistant to corrosion may be used in lieu thereof.

The diaphragm 23 cooperates with the head 19 and other structure to confine a clean liquid which transmits the pressure applied to the diaphragm 23 from the passage 13 to the interior of a pressure responsive bellows 25. In a similar manner, the diaphragm 24 cooperates with the head 20 and other structure to confine a clean liquid about the exterior of the pressure responsive bellows 25. In this manner, if the fluid flowing through the venturi throat 10 is of a corrosive nature or contains sedimentary solids, this fluid is kept by the diaphragms 23 and 24 from contacting the bellows 25 or any of the structure associated therewith.

The bellows 25 is disposed within a housing consisting principally of two parts 26 and 27, the end of the part 26 being closed by a head 29. A hollow nut 30 equipped with a threaded extension 31 is screwed into the part 27 and provides a means on which one end of the bellows 25 may be anchored. The bellows may be attached to the nut 30 by any suitable means such as seam welding. The other end of the bellows 25 is free to move in response to the pressures supplied to its interior and exterior. This movable end of the bellows is closed by a cap 32 on which is mounted a two-part stem, the parts of which are indicated at 33 and 34.

On the stem there is a disk 35 connected to a perforated plate or spider 37 by tension springs 36. The perforated plate or spider 37 is clamped between the part 26 and the head 29. A cap 38 is screwed onto the stem and forms a shoulder on the stem against which the disk 35 is positioned. The compression spring 39 merely takes up any looseness or lost motion between the parts.

The springs 36 bias the movable end of the bellows 25 in one direction. By removing the head 29 the cap 38 can be adjusted on the stem and the entire structure can be adjusted thereby, particularly with reference to a zero position wherein no pressures exist on the interior and exterior of the bellows which are unbalanced.

The tubular extension 31 on the nut 30 provides two annular opposed valve seats 40 and 41 which are disposed about the stem and through which the clean liquid confined by the diaphragm 23 must flow into or out of the bellows 25. On the stem there are two opposed closures formed by resilient rings 42 and 43. These closures are engageable with and are adapted to seat upon the seats 40 and 41, respectively. Thus, if the pressure on the diaphragm 23 becomes excessive with respect to the pressure on the diaphragm 24 causing liquid to enter the bellows 25 in an excessive amount the clossure 42 will seat on the seat 40, preventing the further ingress of liquid and protecting the bellows 25 against rupture. Conversely, if conditions should be such that an excessive pressure is applied to the diaphragm 24 and conducted thereby to the exterior of the bellows 25, the closure 43 will seat on the seat 41 confining or entrapping incompressible liquid within the bellows 25 and thus preventing its collapse.

The liquid confined by the bellows 23 is transmitted to the interior of the part 27 of the bellows housing through tubing 44 which terminates in a port indicated at 45. In a similar manner, the liquid confined by the diaphragm 24 is transmitted through tubing 46 terminating in a port 47 which discharges into the part 26 on the exterior of the bellows 25, see Fig. 4. Movements of the free end of the bellows 25 and of the stem are transmitted to the exterior of the bellows housing by providing the stem with trunnions 48, see Fig. 2, which are rotatably disposed in a fork 49 that is rigidly mounted on a tube 50. The tube 50 is rotatably supported within needle bearings 51 and is rigidly secured at its end to the end of a torque tube 52. The opposite end of the torque tube is rigidly mounted as at 53 within a fitting 54. A rod 55 is disposed within the torque tube and is anchored at 56 to the end of the torque tube. The rod 55 extends out of the housing through the end of the torque tube and may have a pointer 57 mounted thereon or may be connected to other structure which is to be actuated in response to the differential existing between the two pressures. The torque tube transmitter above described is but one means for transmitting movements of the free end of the bellows, and consequently of the stem to the exterior of the housing. Other means for transmitting such movements may be employed in lieu thereof.

The operation of the above-described constructions is substantially as follows:

In the normal situation flow of fluid through the throat 10 causes a differential in pressure to exist in the two passages 13 and 14 with the pressure in the passage 13 lower than that of the pressure in the passage 14. These pressures are transmitted to the diaphragms 23 and 24, respectively, and are transmitted through these diaphragms to the liquids confined thereby which are in the tubings 44 and 46, respectively. The liquids in these tubings are maintained in a relatively clean and uncontaminated condition and transmit the pressures to the interior and exterior of the bellows, 25, respectively. The bellows 25 is actuated in accordance with the degree of differential and the movement of its free end is transmitted through the stem to the torque tube transmitter and by means of the rod 55 to the exterior of the bellows housing. As above explained, if either pressure for one reason or another should become excessive one of the closures 42 or 43 will seat confining the liquid within the bellows. In one instance, further ingress of liquid is prevented. In the other instance further egress of liquid is prevented. In either instance, the bellows is protected against rupture or collapse.

Figure 5:
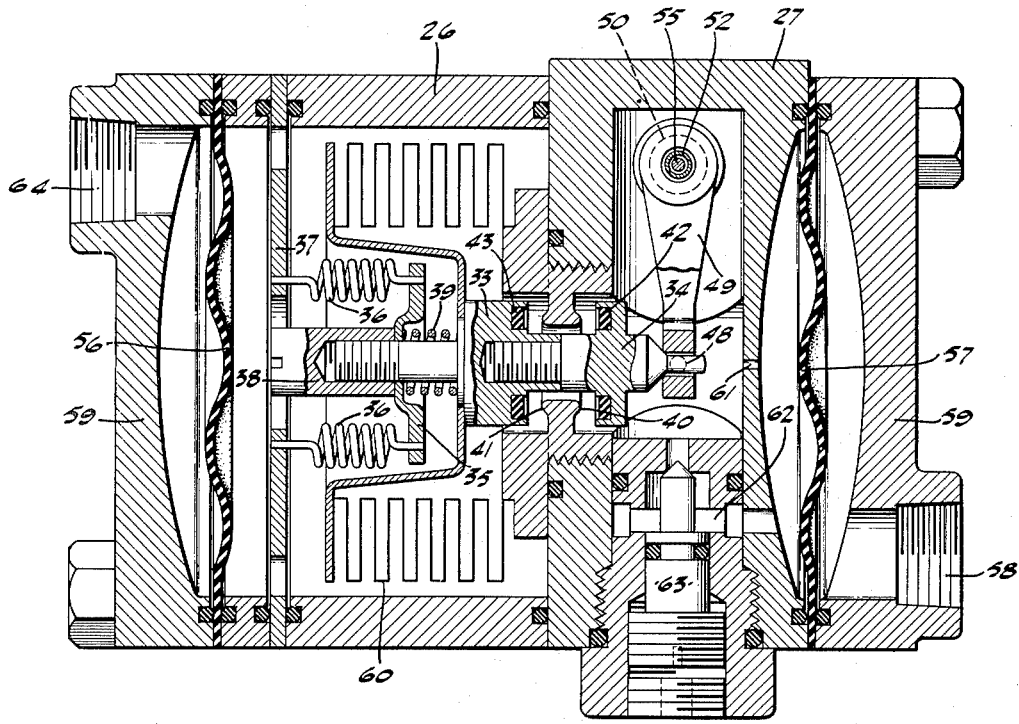
Fig. 5 is a view similar to Fig. 1, but illustrating a modified or alternative form of construction.
Figure 4:
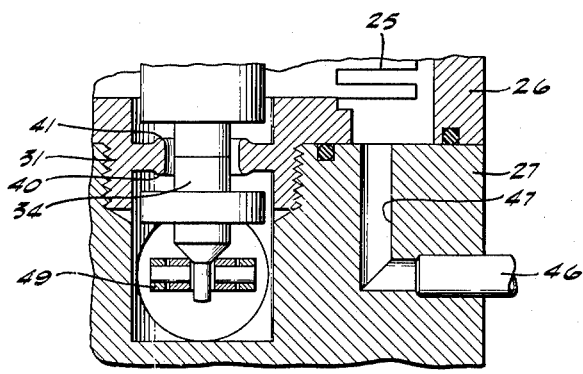
Fig. 4 is a partial view in section taken substantially upon the line 4—4 upon Fig. 2.

The above described structure of the bellows housing is such as to facilitate the mounting of the diaphragms directly thereon when occasion requires. Such a modified structure is illustrated in Fig. 5 wherein the limp, flexible diaphragms 56 and 57 are mounted on the housing itself. In this form of construction the ports 45 and 47 may either be omitted or may be plugged. One of the pressures is conducted through the port 58 in the end head 59 to the outer side of the diaphragm 57 and is transmitted thereby to the clean liquid which is confined within the bellows indicated at 60. This liquid may flow through the port 61 and also through a bypass 62 which is adjustable by means of an adjustable needle valve 63. The adjustment of the needle valve controlling the bypass may produce desirable dampening effects where the pressures supplied are of a pulsating nature. The other pressure is conducted to the outer side of the diaphragm 56 through a port 64 and is transmitted thereby to the clean liquid that fills the space about the bellows 60. In other respects the structure illustrated in Fig. 5 is substantially the same as previously described and functions in substantially the same manner.

In the constructions as above described it will be appreciated that liquid which is clean and uncontaminated is disposed within the bellows and submerges the working parts including the two part stem 33 and 34, the connection to the fork 49, the fork, the torque tube and the bearings surrounding the torque tube. This liquid is maintained in a clean or uncontaminated condition by the limp diaphragm 23 in the construction illustrated in Figs. 1, 2 and 3, and 57 in the case of the construction illustrated in Fig. 5. Consequently, the bearings are kept clean and if the fluid is of a corrosive nature the working parts are effectively protected against corrosion.

Where the diaphragm is of a high limp nature having no appreciable resiliency or spring back increases of volume of the clean liquid occasioned by rises in temperature are automatically compensated for. Thus, if the clean liquid is expanded by a rise in temperature it merely pushes the limp diaphragm ahead of it without disturbing or modifying the action of the bellows. Conversely, if the clean liquid counteracts the limp diaphragm it merely moves with it in maintaining an interface between the fluid and clean liquid. If the diaphragm is not limp but has an appreciable resiliency or spring back, this is detrimental in that the spring back tends to exert a pressure of itself on the clean liquid and, consequently, disturb the position of the free end of the bellows.

From the above described constructions it will be appreciated that a differential pressure responsive device has been provided wherein but a single bellows is employed. This bellows however is protected at all times against rupture or collapse by the opposed closures on the stem which are engageable with the opposed valve seats. In addition, thereto, the pressures are transmitted to the interior and exterior of the bellows, respectively, by liquids which are maintained in a clean condition by the pressure transmitting diaphragms through which the pressures are, in turn, transmitted.

The use of a clean liquid on the exterior of the bellows to some extent may be regarded as optional as it is not essential unless the fluid pressure transmitted thereto is of a nature which is apt to corrode or destroy the bellows itself.

Various changes may be made in the details of construction without departing from the spirit and scope of the invention as defined by the appended claims.

I claim:

1. A device responsive to the differential between two pressures comprising a single bellows, means for supporting the bellows at one end thereof so that the other end is movable in response to the pressures, means for conducting one of said pressures to the exterior of the bellows, means for conducting the other pressure to the interior of said bellows, a stem connected to the free end of the bellows, opposed valve seats about the stem and through which ingress and egress to and from the interior of the bellows is obtained, a pair of opposed valve closures on the stem engageable with said valve seats respectively, and a swingable arm connected to the stem on the opposite side of the valve closures from the end of the bellows to which the stem is secured for supporting that end of the stem whereby when the differential between the pressures becomes excessive one of said valve closures will seat upon its seat closing the interior of the bellows against ingress or egress and thus preventing rupture of the bellows.

2. A device responsive to the differential between two pressures comprising a single bellows, means for supporting the bellows at one end thereof so that the other end is movable in response to the pressures, a pressure transmitting diaphragm confining a liquid about the exterior of the bellows, a second pressure transmitting diaphragm confining a liquid within the bellows, a stem secured to the free end of the bellows and submerged in the second mentioned liquid, opposed valve seats in the second mentioned liquid and about the stem through which ingress and egress to and from the bellows occurs, opposed valve closures on the stem adapted to seat upon said seats respectively when the differential in pressures becomes excessive so as to confine the liquid in the bellows and thus prevent destruction of the bellows and a swingable arm supporting that end of the stem remote from the end of the stem that is secured to the movable end of the bellows, said arm being pivotally connected to the stem.

3. A device responsive to the differential between two pressures comprising a bellows anchored at one end and movable at the other, means including two diaphragms for confining a liquid against the interior and exterior of the bellows, means for conducting pressures between which a differential may exist to the diaphragms, respectively, so as to be transmitted therethrough to the liquid and transmitted thereby to the inside and outside of the bellows, respectively, opposed valve seats through which pressure applied to one of the diaphragms is transmitted to the interior of the bellows, a stem secured to the movable end of the bellows extending through the valve seats, opposed valve closures on the stem engageable with said valve seats, respectively, a swingable arm pivotally connected to the stem on the opposite side of the valve closures from that end of the stem which is secured to the movable end of the bellows, whereby when the differential in pressure becomes excessive one of said closures will seat upon its seat confining liquid within the bellows and thus preventing destruction of the bellows.

4. A device responsive to the differential between two pressures comprising a bellows anchored at one end and movable at the other, means including two diaphragms for confining a liquid against the interior and exterior of the bellows, means for conducting pressures between which a differential may exist to the diaphragms, respectively, so as to be transmitted therethrough to the liquid and transmitted thereby to the inside and outside of the bellows, respectively, opposed valve seats through which pressure applied to one of the diaphragms is transmitted to one side of the bellows, a stem secured to the movable end of the bellows extending through the valve seats, opposed valve closures on the stem engageable with said valve seats, respectively, and a swingable arm supportingly engaging the stem on the opposite side of the valve closures from that end of the stem which is connected to the movable end of the bellows whereby when the differential in pressures becomes excessive one of said closures will seat upon its seat confining liquid within the bellows and thus preventing destruction of the bellows.

5. A device responsive to the differential between two pressures comprising a bellows anchored at one end and movable at the other, means including two diaphragms for confining a liquid against the interior and exterior of the bellows, means for conducting pressures between which a differential may exist to the diaphragms, respective, so as to be transmitted therethrough to the liquid and transmitted thereby to the inside and outside of the bellows, respectively, opposed valve seats through which pressure applied to one of the diaphragms is transmitted to one side of the bellows, a stem secured to the movable end of the bellows extending through the valve seats, opposed valve closures on the stem engageable with said valve seats, respectively, whereby when the differential in pressures becomes excessive one of said closures will seat upon its seat confining liquid within the bellows and thus preventing destruction of the bellows, and means for transmitting movements of the free end of the bellows to the exterior of the liquid confining means connected to the stem on the opposite side of the valve closures from the connection between the stem and the movable end of the bellows.

6. A device responsive to the differential between two pressures comprising a bellows anchored at one end and movable at the other, means including two diaphragms for confining a liquid against the interior and exterior of the bellows, means for conducting pressures between which a differential may exist to the diaphragms, respectively, so as to be transmitted therethrough to the liquid and transmitted thereby to the inside and outside of the bellows, respectively, opposed valve seats through which pressure applied to one of the diaphragms is transmitted to one side of the bellows, a stem secured to the movable end of the bellows extending through the valve seats, opposed valve closures on the stem engageable with said valve seats, respectively, whereby when the differential in pressures becomes excessive one of said closures will seat upon its seat confining liquid within the bellows and thus preventing destruction of the bellows, and means operable by the stem for transmitting movements of the free end of the bellows to the exterior of liquid confining means connected to the stem on the opposite side of the valve closures from the movable end of the bellows.

7. A differential pressure responsive device comprising a housing, a bellows mounted within said housing having one end movable in response to differential pressures to which opposite sides of the bellows may be subjected, a stem secured to the movable end of the bellows and movable therewith, opposed valve closures on the stem, seats on which the valve closures may seat when the movable end of the bellows moves beyond a predetermined distance, means for transmitting movements of the movable end of the bellows to the exterior of the housing connected to the stem on the opposite side of the valve closures from the movable end of the bellows, a flexible diaphragm confining a clean liquid in the housing about the transmitting means and about the valve closures and seats and against one side of the bellows, means for conducting one of the pressures between which a differential may exist to the other side of the bellows so as to be effective thereon, and means for conducting the other of said pressures to the outer side of the diaphragm.

References Cited in the file of this patent

UNITED STATES PATENTS

| | | |
|---|---|---|
| 2,177,674 | Schweizer | Oct. 31, 1939 |
| 2,276,580 | Hofer | Mar. 17, 1942 |
| 2,358,845 | Alexanderson | Sept. 26, 1944 |
| 2,367,087 | Beecher | Jan. 9, 1945 |
| 2,400,048 | Jones | May 7, 1946 |